(12) United States Patent
DiFalco et al.

(10) Patent No.: US 7,822,724 B2
(45) Date of Patent: Oct. 26, 2010

(54) CHANGE AUDIT METHOD, APPARATUS AND SYSTEM

(75) Inventors: Robert A. DiFalco, Portland, OR (US); Kenneth L. Keeler, Lake Oswego, OR (US); Robert L. Warmack, West Linn, OR (US)

(73) Assignee: Tripwire, Inc., Portland, OR (US)

( * ) Notice: Subject to any disclaimer, the term of this patent is extended or adjusted under 35 U.S.C. 154(b) by 640 days.

(21) Appl. No.: 11/205,544

(22) Filed: Aug. 16, 2005

(65) Prior Publication Data

US 2005/0278191 A1  Dec. 15, 2005

Related U.S. Application Data (63) Continuation-in-part of application No. 11/171,096, filed on Jun. 29, 2005, and a continuation-in-part of application No. 11/171,955, filed on Jun. 29, 2005, now Pat. No. 7,620,715, and a continuation-in-part of application No. 11/097,681, filed on Mar. 31, 2005, and a continuation-in-part of application No. 10/188,430, filed on Jul. 3, 2002, now Pat. No. 7,316,016.

(51) Int. Cl.
G06F 17/00 (2006.01)
G06F 7/00 (2006.01)

(52) U.S. Cl. ........... 707/695; 707/610; 707/638; 707/966; 709/224; 714/2; 714/41; 714/799

(58) Field of Classification Search ............ None
See application file for complete search history.

(56) References Cited

U.S. PATENT DOCUMENTS

| | | | | |
|---|---|---|---|---|
| 5,655,081 | A * | 8/1997 | Bonnell et al. | 709/202 |
| 6,064,656 | A * | 5/2000 | Angal et al. | 370/254 |
| 6,658,568 | B1 * | 12/2003 | Ginter et al. | 713/193 |
| 6,742,114 | B1 * | 5/2004 | Carter et al. | 713/156 |
| 6,853,987 | B1 * | 2/2005 | Cook | 705/75 |
| 6,886,047 | B2 * | 4/2005 | Leong et al. | 709/246 |
| 6,957,227 | B2 * | 10/2005 | Fogel et al. | 707/102 |
| 7,035,877 | B2 * | 4/2006 | Markham et al. | 707/200 |
| 7,051,050 | B2 * | 5/2006 | Chen et al. | 707/200 |
| 7,065,767 | B2 * | 6/2006 | Kambhammettu et al. | 719/310 |
| 7,080,037 | B2 * | 7/2006 | Burger et al. | 705/50 |
| 2002/0026339 | A1 * | 2/2002 | Frankland et al. | 705/7 |
| 2002/0035561 | A1 * | 3/2002 | Archer et al. | 707/6 |
| 2002/0116363 | A1 * | 8/2002 | Grainger | 707/1 |
| 2003/0101341 | A1 * | 5/2003 | Kettler et al. | 713/162 |
| 2003/0197743 | A1 | 10/2003 | Hill et al. | |
| 2004/0006614 | A1 | 1/2004 | DiFalco | |
| 2004/0059930 | A1 | 3/2004 | DiFalco et al. | |
| 2004/0060046 | A1 | 3/2004 | Good et al. | |

(Continued)

*Primary Examiner*—Greta L Robinson
*Assistant Examiner*—James J Wilcox
(74) *Attorney, Agent, or Firm*—Schwabe, Williamson & Wyatt (57) ABSTRACT

A method for facilitating management of a data processing environment is disclosed. In various embodiments, the method may include facilitating homogeneous monitoring of a plurality of heterogeneous data processing nodes of the data processing environment, the homogeneous monitoring including facilitating detecting one or more changes of one or more elements of the plurality of heterogeneous data processing nodes. In various embodiments, the method may further include facilitating performing one or more actions in response to detecting the one or more changes. Other embodiments of the present invention may include, but are not limited to, apparatuses and systems adapted to facilitate practice of the above-described method.

26 Claims, 6 Drawing Sheets

U.S. PATENT DOCUMENTS

| | | |
|---|---|---|
| 2004/0122962 A1 | 6/2004 | DiFalco et al. |
| 2004/0123133 A1 | 6/2004 | DiFalco et al. |
| 2005/0096949 A1 | 5/2005 | Aiber et al. |
| 2005/0149578 A1 | 7/2005 | Sustman et al. |
| 2005/0177600 A1 | 8/2005 | Eilam et al. |

* cited by examiner

CHANGE AUDIT METHOD, APPARATUS AND SYSTEM

CROSS-REFERENCE TO RELATED APPLICATIONS

This application is a continuation in part of the following applications: application Ser. No. 10/188,430, now U.S. Pat. No. 7,316,016, entitled Homogeneous Monitoring of Heterogeneous Nodes, filed Jul. 3, 2002; application Ser. No. 11/097,681, entitled Data Processing Environment Change Management Methods and Apparatuses, filed Mar. 31, 2005; application Ser. No. 11/171,955, now U.S. Pat. No. 7,620,715, entitled Change Event Correlation, filed Jun. 29, 2005; application Ser. No. 11/171,096, entitled Out-of-Band Change Detection, filed Jun. 29, 2005; priority from the respective filing dates of these applications is hereby claimed under 35 USC §120. All of the above applications, namely application Ser. Nos. 10/188,430, 11/097,681, 11/171,955 and 11/171,096, are hereby fully incorporated by reference.

This application is related to concurrently filed U.S. patent application Ser. No. 11/205,586, entitled Conformance Authority Reconciliation, by Robert A. DiFalco, Kenneth L. Keeler, and Robert L. Warmack, which is hereby fully incorporated by reference.

FIELD

Disclosed embodiments of the present invention relate generally to the field of data processing, and more particularly to change audit methods, apparatuses, and systems in data processing environments.

BACKGROUND

Data processing devices are deployed in many different configurations and are used for many different applications in a variety of data processing environments. Management of a data processing environment may be performed in a number of nonexclusive ways. Changes may occur to data processing devices of a data processing environment. Compliance with various regulatory and/or other guidelines may be impacted by these changes.

BRIEF DESCRIPTION OF THE DRAWINGS

Embodiments of the invention are illustrated by way of example, and not by way of limitation, in the figures of the accompanying drawings, in which like references indicate similar elements and in which.

DETAILED DESCRIPTION OF ILLUSTRATIVE EMBODIMENTS

Embodiments of the present invention include, but are not limited to, a method for facilitating management of a data processing environment. In various embodiments, the method may include facilitating homogeneous monitoring of a plurality of heterogeneous data processing nodes of the data processing environment, the homogeneous monitoring including facilitating detecting one or more changes of one or more elements of the plurality of heterogeneous data processing nodes. In various embodiments, the method may further include facilitating performing one or more actions in response to detecting the one or more changes. Other embodiments of the present invention may include, but are not limited to, apparatuses and systems adapted to facilitate practice of the above-described method. While portions of the following discussion may be primarily presented in the context of specific types of data processing devices, it is understood that the principles described herein apply to a broad range of data processing devices.

In the following description, various aspects of embodiments of the present invention will be described. However, it will be apparent to those skilled in the art that other embodiments may be practiced with only some of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Parts of the descriptions of various embodiments will be presented in terms of operations performed by a processor-based device, using terms such as data and the like, consistent with the manner commonly employed by those skilled in the art to convey the substance of their work to others skilled in the art. As well understood by those skilled in the art, the quantities may take the form of electrical, magnetic, or optical signals capable of being stored, transferred, combined, and otherwise manipulated through mechanical and electrical components of the processor-based device; and the term processor includes microprocessors, micro-controllers, digital signal processors, and the like, that are standalone, adjunct or embedded.

Various operations will be described as multiple discrete operations in turn, in a manner that is most helpful in understanding the embodiments; however, the order of description should not be construed as to imply that these operations are necessarily order dependent. In particular, these operations need not be performed in the order of presentation.

The phrase "in some embodiments" is used repeatedly. The phrase does not generally refer to the same group of embodiments, however, it may. The phrase "in various embodiments" is used repeatedly. The phrase does not generally refer to the same group of embodiments, however, it may. The terms "comprising," "having" and "including" are synonymous, unless the context dictates otherwise.

Various embodiments of the present invention include a scalable architecture to facilitate a change audit method in data processing environments containing data processing devices. Such data processing devices may include, but are not limited to, networking devices, servers, desktop computers, laptop computers, tablet computers, personal digital assistants, cellular phones, set top boxes, media players, or other types of data processing devices. In some embodiments, a data processing environment may comprise a continuously or intermittently connected environment of data processing devices, including data processing devices communicating through the Internet. In some embodiments, a data processing environment may comprise a directly or indirectly connected environment of data processing devices, including data processing devices communicating through the Internet. In various embodiments, one or more modules may facilitate the operations described herein.

In various embodiments, a change audit method, apparatus or system may include a distributed and scalable architecture to facilitate reactive detection of operational state changes in diverse, heterogeneous objects. User interaction with such diverse objects may be facilitated through a homogeneous user-interface metaphor through which the rules of interaction may remain constant, independent of the individual characteristics of the element and/or data processing node being monitored.

Operationally, the architecture described herein may facilitate detection of state-changes in monitored objects, logging of detected state-changes, and alerting users of detected state-changes for potential remediation. In various embodiments, a state change may be detected whenever a monitored object deviates from its baseline state. In various embodiments, a baseline of an element may include a known, good state, or an authoritative state, of the element. In various other embodiments, a baseline of an element may include another state of the element. A user may respond to a state change, for example, by updating the baseline with the deviated state or restoring the object to its baseline state, or such operations may occur automatically, according to various embodiments. The objects used to model these and other operations may include rules, data processing nodes, groups, responses, and scheduled tasks.

Rules may contain the criteria used for detecting state-changes and may enable a user to define which objects are monitored and how the objects are monitored, according to various embodiments. In some embodiments, the rules may not contain the actual location where the detection should occur. This may enable the same rule to be applied to multiple locations or data processing nodes on a network. For example, a rule for a file system object may stipulate that an MD5 hash be generated in association with the file object, and compared against a baseline MD5 hash for the file object. If a deviation is detected, a state-change may be logged. In various embodiments, rules may be user-defined through a homogeneous graphical user interface (GUI).

Where rules may define what objects are monitored and how they are monitored, data processing nodes may identify where a rule should run, according to various embodiments. Different rules may be targeted against different types of data processing nodes. For example, a rule that states the criteria for a router configuration check may target a router node, while a rule that detects changes to files may target a workstation node.

Rules and data processing nodes may be arranged into logical groups, which may themselves include other rule and data processing node subgroups. In various embodiments of the invention, a user may create logical groupings of rules and data processing nodes in any organizational way that makes sense to the user. The rule and data processing node groups can be used in the system in the same way their individual contents can, which may allow rules and data processing nodes to be defined once and to be hierarchically arranged thereafter if so desired. In various embodiments, logical rule and data processing node groupings may be user-defined through a homogeneous GUI.

Responses may define what action should be taken in response to a detected state-change. Different responses may be appropriate for different rule/data processing node combinations. In various embodiments, responses may be configured to execute automatically when a state-change is detected or to execute manually through user-interaction.

Scheduling may define the frequency with which rules may run to detect state changes on data processing nodes. A task may essentially define the rules to run, the data processing nodes those rules should run for (i.e., be asserted against), and the frequency with which rule and data processing node pairs should be run. A task may schedule a rule or rule-group to run for a data processing node or data processing node-group. In various embodiments, if a data processing node group is scheduled against a rule group, a product of each group may be taken to form individual node/rule pairings. In various embodiments, tasks may be synthesized based upon user input (e.g., rule and data processing node groupings) received via a GUI.

Figure 1:
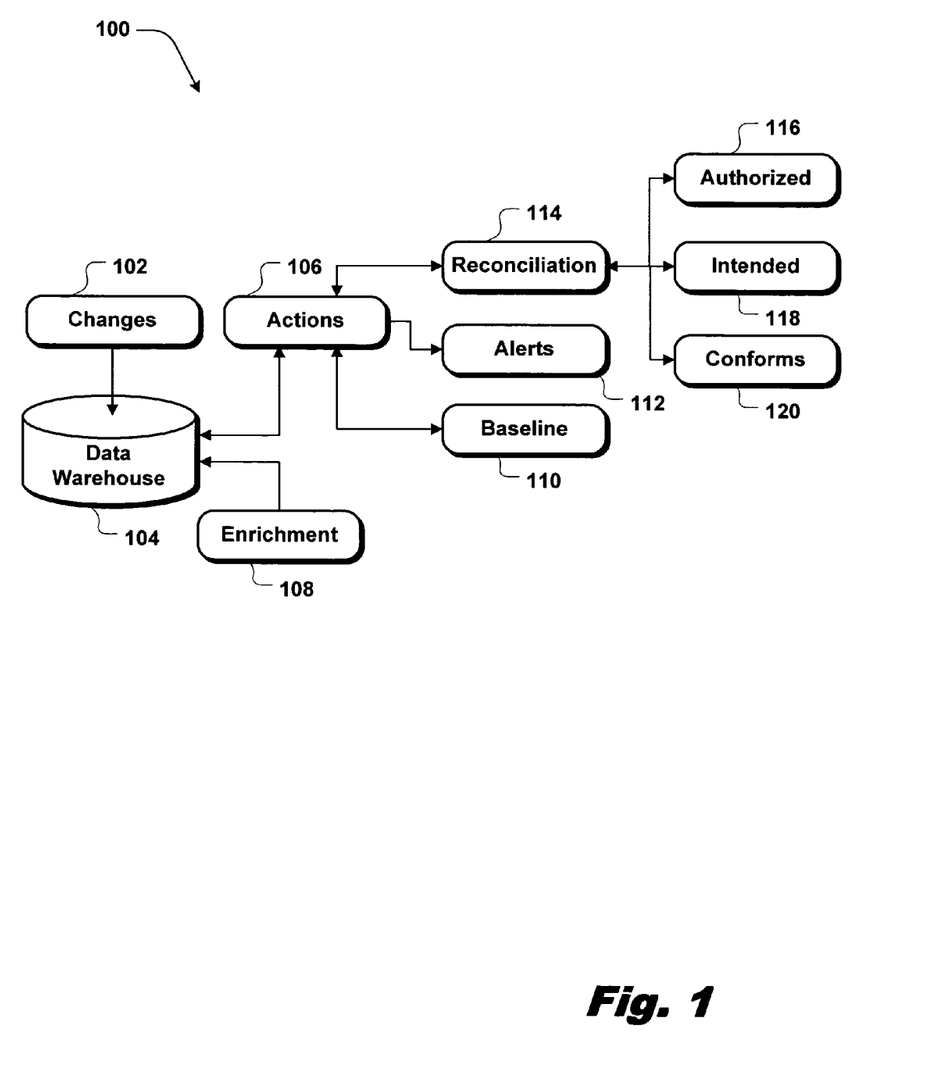
FIG. 1 illustrates some aspects of a change audit system, in accordance with various embodiments of this invention.

FIG. 1 illustrates some aspects of change audit system 100, in accordance with various embodiments of this invention. In various embodiments, change audit system 100 may include one or more of the following: changes operation 102, data warehouse 104, enrichment operation 108, actions operation 106, baseline operation 110, alerts operation 112, reconciliation operation 114, authorized operation 116, intended operation 118, and/or conforms operation 120. In various embodiments, change audit system 100 may include other operations. While certain operations are illustrated in FIG. 1, other operations may supplement or supplant the operations shown, in the context of various embodiments. In various embodiments, change audit system 100 may operate in the context of a data processing environment comprising one or more data processing devices. In various embodiments, these data processing devices may comprise a wide range of data processing devices, such as, but not limited to, a networking device (a router, a switch, a gateway, or the like), a server, a desktop computer, a laptop computer, a tablet computer, a personal data assistant, a cellular phone, a set top box, a media player, or the like. In various embodiments, portions or all of change audit system 100 may be referred to as a change audit apparatus.

In various embodiments, change audit system 100 may include changes operation 102. In various embodiments, changes operation 102 may facilitate homogeneous monitoring of a plurality of heterogeneous data processing nodes (not shown) of a data processing environment, with the homogeneous monitoring including facilitating detecting one or more changes of one or more elements of the plurality of heterogeneous data processing nodes. In various embodiments, changes operation 102 may facilitate performing one or more actions in response to detecting the one or more changes. In various embodiments, the one or more actions may be termed one or more responses.

In various embodiments, the facilitating detecting one or more changes may comprise facilitating taking snapshots of states of one or more elements of the plurality of heterogeneous data processing nodes. In various embodiments, at least some of the snapshots may be stored in data warehouse 104. In various embodiments, one or more versions of the one or more elements may be stored in data warehouse 104. In various embodiments, memorializations of changes of the one or more elements may be stored in data warehouse 104. In various embodiments, other items may be stored in data warehouse 104. In various embodiments, data warehouse 104 may comprise any type of data store or data storage place.

In various embodiments, change audit system 100 may include enrichment operation 108. In various embodiments, enrichment operation 108 may include facilitating correlating one of the one or more changes to one or more events associated with an element, and may further include reporting the detected change for the element, supplemented with one or more of the correlated events of the element. In various embodiments, an element may comprise, for example, a file of a data processing device. In various embodiments, an element may comprise another component of a data processing device. In various embodiments, enrichment operation 108 may involve enriching at least some of the data stored in data warehouse 104 with events from a wide range of sources (not shown), such as, but not limited to, event or audit logs, a package manager, an installation engine of programs, etc.

In various embodiments, changes operation's (102) facilitating homogeneous monitoring of the plurality of heterogeneous data processing nodes may comprise defining a first logical grouping of one or more data processing nodes to be monitored, with the one or more data processing nodes corresponding to one or more data processing node-types. In various embodiments, changes operation's (102) facilitating homogeneous monitoring may further comprise defining a second logical grouping of one or more rules to be asserted against at least a subset of the first logical grouping of data processing nodes, with each of the one or more rules identifying criteria for detecting an operational state change of one or more data processing nodes. In various embodiments, changes operation's (102) facilitating homogeneous monitoring may further comprise generating one or more monitoring tasks, with each of the monitoring tasks defining which ones of the second logical grouping of rules to assert against which ones of the first logical grouping of one or more data processing nodes.

In various embodiments, change audit system 100 may include actions operation 106. In various embodiments, actions operation 106 may include one or more actions, such as, for example, reconciliation operation 114, alerts operation 112, and baseline operation 110. In various embodiments, alerts operation 112 may include alerting a detected change. Alerting a detected change may take many forms, according to various embodiments, including but not limited to, creating a helpdesk incident, alerting with a severity state indicator of the change in a GUI, notifying a user (for example, a system administrator) of the detected change, reverting the element (or a portion of the element) back to its baseline state, etc. In various embodiments, alerts operation 112 may include facilitating a user to modify the element at issue. In various embodiments, alerts operation 112 may include other sub-operations. In various embodiments, alerts operation 112 may operate in conjunction with one or more of the reconciliation operations of: authorized operation 116, intended operation 118, and/or conforms operation 120. In various embodiments, alerts operation 112 may operate in conjunction with additional and/or alternative reconciliation operations.

In various embodiments, reconciliation operation 114 may comprise determining whether at least one of the one or more detected changes was authorized via authorized operation 116. In various embodiments, authorized operation 116 may include learning of a submission of a request, in digital form, to make a modification. In various embodiments, authorized operation 116 may further include determining whether to allow the requested modification to be scheduled or assigned for implementation, in response to learning of the submission of the request. In various embodiments, authorized operation 116 may further include conditionally indicating allowance of the requested modification, based at least in part on the result of the determining whether to allow the requested modification to be scheduled or assigned for implementation. In various embodiments, authorized operation 116 may operate in the context of determining whether a detected change is associated with a work ticket, a maintenance window, or the like. In various embodiments, authorized operation 116 may operate in the context of determining whether a detected change was "planned" or "unplanned."

In various embodiments, reconciliation operation 114 may comprise determining whether at least one of the one or more detected changes was intended via intended operation 118. In various embodiments, intended operation 118 may include facilitating creation in digital form of a first memorialization of at least one of the one or more changes. In various embodiments, intended operation 118 may further include facilitating comparison of the first memorialization to a second memorialization of one or more in-band changes that should have been made to facilitate detection of one or more out-of-band changes. In various embodiments, intended operation 118 may be performed in the context of reconciling a detected change with changes made by a change agent (not shown), or changes in-band to such a change agent. In various embodiments, such a change agent may include, but not be limited to, a configuration management tool. In various embodiments, intended operation 118 may operate in the context of determining whether a detected change is "known" or "unknown."

In various embodiments, reconciliation operation 114 may comprise determining whether at least one of the one or more detected changes was conforming via conforms operation 120. In various embodiments, conforms operation 120 may include determining whether at least one of the one or more changes conforms with a conformance authority, with the conformance authority having one or more guidelines. In various embodiments, the conformance authority may include, but not be limited to, a policy-based management tool. In various embodiments, conforms operation 120 may operate in the context of determining whether a detected change was "desirable" or "undesirable."

In various embodiments, a change audit method may be performed to maintain or demonstrate control of an enterprise's information technology infrastructure. In various embodiments, a change audit method may be performed to maintain or demonstrate control of an enterprise's financial systems or data. In various embodiments, a change audit method may be performed to maintain or demonstrate control of an enterprise's business processes, such as, for example, enterprise resource planning (ERP) or customer relationship management (CRM). In various embodiments, a change audit method may be performed to facilitate compliance with governmental laws/regulations regarding establishment and maintenance of an internal control structure and/or procedures for financial reporting, such as, for example, the Sarbanes-Oxley Act (the Public Company Accounting Reform and Investor Protection Act), including any amendments and/or successor Acts to any part of the Sarbanes-Oxley Act, or the like.

In various embodiments, a change audit method may be performed to facilitate compliance with a number of laws, regulations, or guidelines, including but not limited to, the Gramm Leach Bliley Act, the regulations of Food and Drug Administration 21 Code of Federal Regulations 11, the Health Insurance Portability & Accountability Act, the Visa Cardholder Information Security Plan, the Payment Card Industry (PCI) Data Security Standard, the National Credit Union Administration Guidelines, the Office of the Comptroller of the Currency Guidelines, the International Organization for Standardization 17799, Common Criteria Certification, California Civil Code Senate Bill 1386 (California Security Breach Information Act), or the like, including any amendments and/or successors to any of the above, or the like.

In various embodiments, a change audit method may be performed as part of an audit of an enterprise, including but not limited to, a financial accounting or statement audit. In some such embodiments, a change audit method may be performed to at least provide an audit trail for said audit.

In various embodiments where a change audit method is performed to maintain or demonstrate control of an enterprise's information technology infrastructure, financial systems or data, or business processes, use of a change audit method may occur in a number of areas, including but not limited to, access control, network security, auditing and monitoring of security-related events, or the like. In various embodiments where a change audit method is performed to maintain or demonstrate control of an enterprise's information technology infrastructure, financial systems or data, or business processes, said maintenance or demonstration of control may include other aspects of an enterprise's information technology infrastructure, financial systems or data, or business processes, respectively.

In various embodiments where a change audit method is performed as part of an audit of an enterprise, or to facilitate compliance with governmental laws/regulations, use of a change audit method may occur in a number of areas, including but not limited to, access control, network security, auditing and monitoring of security-related events, or the like. In various other embodiments, where a change audit method is performed as part of an audit of an enterprise, or to facilitate compliance with governmental laws/regulations, use of a change audit method may include other aspects of an enterprise audit or regulatory compliance procedures, respectively.

Figure 2:
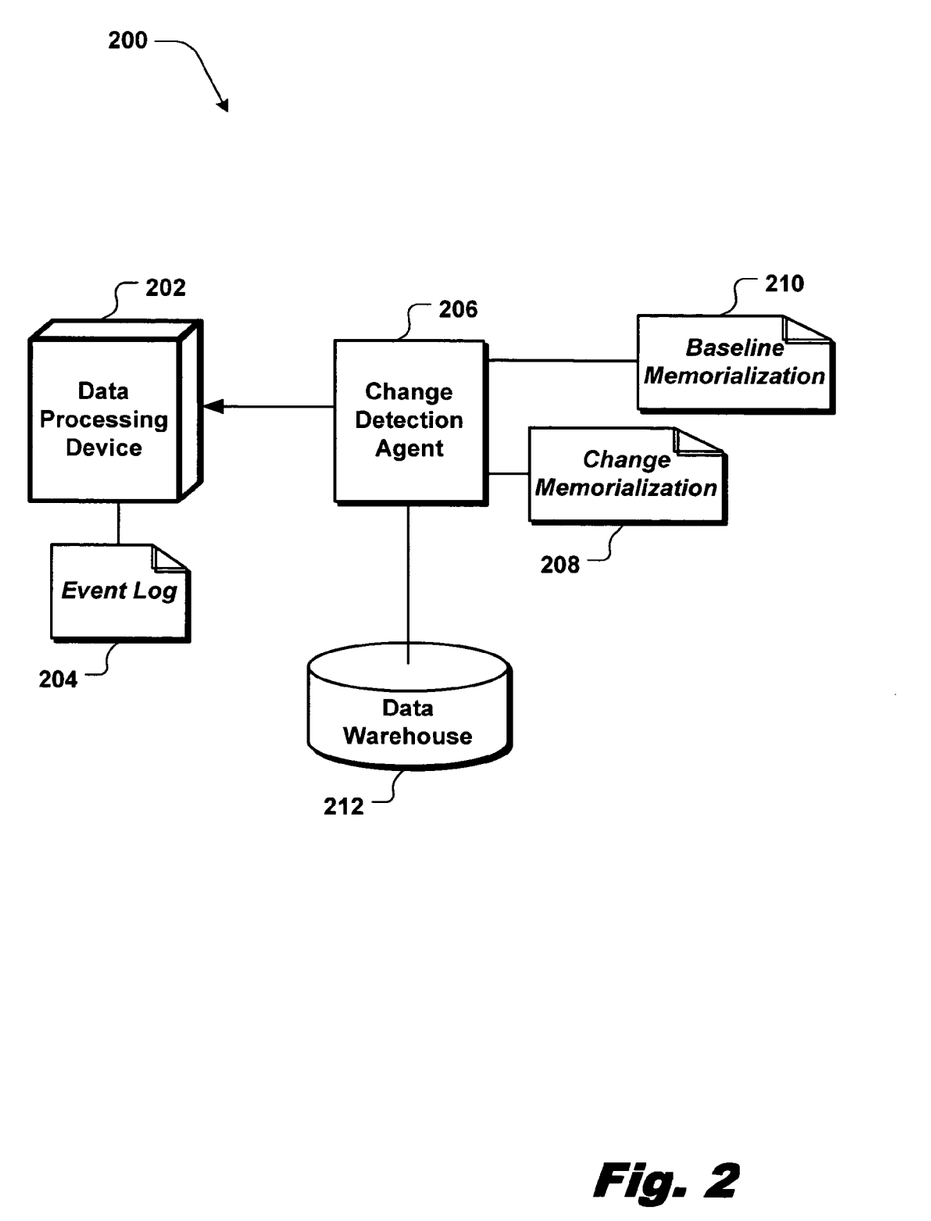
FIG. 2 illustrates some aspects of enrichment, in accordance with various embodiments of this invention.

FIG. 2 illustrates some aspects of enrichment operation 200, in accordance with various embodiments of this invention. Illustrating a portion of a possible operational context in some embodiments, change detection agent 206 may facilitate detecting of a change to an element (not shown) of data processing device 202 of a data processing environment. In various embodiments, an element may comprise, for example, a file of data processing device 202. In various embodiments, an element may comprise another component of data processing device 202. In various embodiments, change detection agent 206 may detected a change in an element and may memorialize the change detected in change memorialization 208. In various embodiments, change memorialization 208 may comprise a memorialization of one or more changes detected in one or more elements of data processing device 202.

In various embodiments, change memorialization 208 may comprise a file. In various embodiments, change memorialization 208 may comprise a different type of memorialization of a change detected. In various embodiments, change detection agent 206 may facilitate detecting a change by facilitating taking a snapshot of a current state (not shown) of an element of data processing device 202, and may further compare the snapshot to a previously taken snapshot (not shown) of the element. In various embodiments, change detection agent 206 may facilitate taking a snapshot of a current state of an element of data processing device 202 in the course of facilitating taking a snapshot of a set of elements of data processing device 202.

In some embodiments, the previously taken snapshot may include a baseline state of the element, with FIG. 2 illustrating some such embodiments with baseline memorialization 210 including a baseline state of the element. In some embodiments, the previously taken snapshot may represent a state other than a current baseline state. In some embodiments, change detection agent 206 may facilitate obtaining the previously taken snapshot of the element. In some embodiments, the previously taken snapshot of the element may be obtained in another manner.

Illustrating a portion of a possible operational context in various embodiments, event log 204 may comprise a number of logged occurrences of events or simply logged events associated with elements of data processing device 202. For example, in the case of a file comprising one type of element, all occurred events, or a subset of the occurred events, associated with the file may be recorded in event log 204, in accordance with some embodiments. In various embodiments, examples of such logged events may comprise when the file is accessed, modified, etc. As data processing device 202 may represent a broad range of devices, event log 204 may correspondingly represent a broad range of event logs and their accompanying constituents, and may involve, for example, TACACS (Terminal Access Controller Access Control System), XTACACS (Extended TACACS), TACACS+, RADIUS (Remote Authentication Dial-In User Service), Diameter, any AAA (Authentication, Authorization and Accounting) protocol, LDAP (Lightweight Directory Access Protocol), and the like, including modifications, successors, and the like. Event logs may be referred to in a wide variety of ways, including audit logs, audit event logs, file audit logs, auto-logs, etc., with the term "audit" being used in a narrower context than used elsewhere herein in describing an audit of an enterprise, which may involve an examination and review of an enterprise's internal controls, information technology infrastructure, financial systems or data, business processes, financial accounting or reporting, etc.

In various embodiments, event log 204 may comprise a memorialization of one event or multiple events. In various embodiments, event log 204 may comprise a memorialization of one type of event, or multiple types of events. In various embodiments, event log 204 may comprise a running memorialization of events. In various embodiments, event log 204 may comprise events logged of one or more elements of data processing device 202. In various embodiments, event log 204 may reside on data processing device 202. In various other embodiments, event log 204 may reside elsewhere in data processing environment 200.

In various embodiments with one event log for data processing device 202, the event log may be created and/or updated by a software of data processing device 202. In some such embodiments, the software may comprise an operating system (OS), or its equivalent, of data processing device 202, while in other such embodiments, the software may comprise software other than an OS, or its equivalent, of data processing device 202. In some embodiments with multiple event logs for data processing device 202, at least one of the event logs may be created and/or updated by a software of data processing device 202. In some such embodiments, the software may comprise an OS, or its equivalent, of data processing device 202, while in other such embodiments, the software may comprise software other than an OS, or its equivalent, of data processing device 202.

Illustrating a portion of a possible operational context in various embodiments, change detection agent 206 may facilitate correlating the change to one or more events associated with the element. In various embodiments, change detection agent 206 may further report the detected change for the element, supplemented with one or more of the correlated events of the element. In some embodiments, the facilitating correlating may comprise retrieving the one or more events associated with the element from a repository of events of the data processing environment. In some embodiments, the repository of events may comprise event log 204. In some embodiments, the repository of events may comprise another data storage area of the data processing environment. In various embodiments, enrichment operation 200 may involve enriching at least some of the data stored in data warehouse 212 with events from a wide range of sources (not shown), such as, but not limited to, event or audit logs, a package manager, an installation engine of programs, etc.

Figure 3:
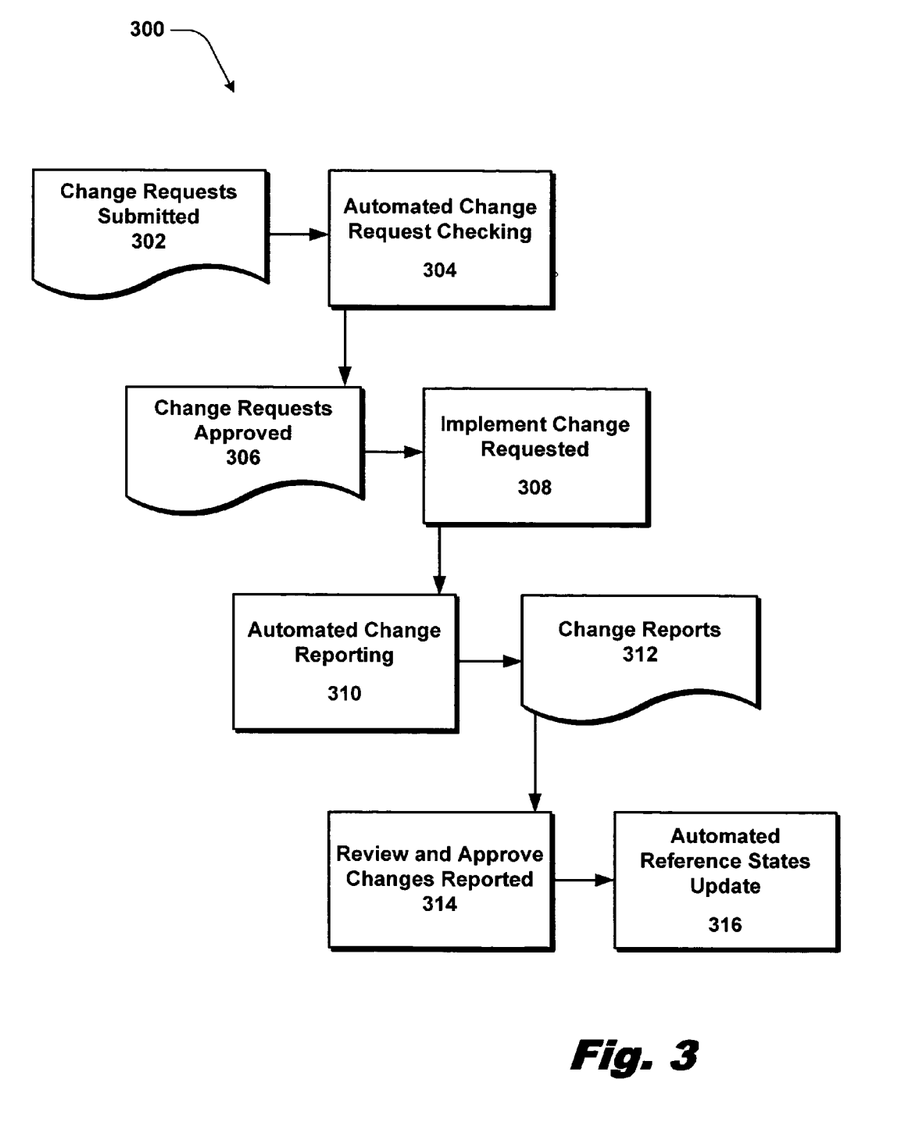
FIG. 3 illustrates some aspects of authorized reconciliation, in accordance with various embodiments of this invention.

FIG. 3 illustrates some aspects of authorized reconciliation operation 300, in accordance with various embodiments of this invention. While certain operations are illustrated in FIG. 3, other operations may supplement or supplant the operations shown, in the context of various embodiments. Authorized reconciliation operation 300 may itself include various operations, such as some or all of the operations illustrated in FIG. 3. Authorized reconciliation operation 300 illustrates an exemplary change management process that may be practiced to manage changes to client devices of a data processing environment, in accordance with various embodiments. As illustrated, Change Requests 302 for requesting changes to hardware, software and/or data of various client devices may be submitted, for example, by various end users and/or IT administrators of a data processing environment. In various embodiments, Change Requests 302, having identification information identifying the elements to be changed, the changes to be applied, and/or dependency of the changes, may be stored in change request queues (not shown).

Further, as illustrated, Automated Change Request Checking 304 on the queued pending change requests may be performed periodically (or continuously) to approve or reject the requested changes. In various embodiments, change management services (not shown) may check the previously approved change requests in change request implementation queues (not shown) to determine whether all dependencies of each queued change request have been implemented (i.e., there is no change implementation pending for any identified change dependency of the change request).

For the illustrated embodiments, the change management services may reject all change requests having dependency on pending change implementations. The change management services may approve only change requests with no dependency on pending change implementations, illustrated as Change Requests Approved 306. In various embodiments, approved change requests may be moved from the change requests queues to the change request implementation queues for implementation scheduling and/or assignment to implementers.

In due course, the approved change requests may be implemented by the assigned implementer(s) at or about the scheduled time, 308. In various embodiments, on notification of implementation of a change request, an automated change reporting 310 may be performed by the change management services, resulting in Change Reports 312.

In various embodiments, the change management services may generate Change Reports 312 by comparing the current state of the applicable client device with its previously saved reference state. In various embodiments, Change Reports 312 may include a number of change records describing the various changes to the hardware, software and/or data elements of the applicable client device.

In various embodiments, Change Reports 312 may be subjected to Review and Approve Changes Reported 314 process. In various embodiments, such a review and approval process may be performed manually, or automated, in full or in part.

In various embodiments, on approval of the changes enumerated in a Change Reports 312 for a client device, the change management services may automatically generate and save the changes (Automated Reference States Update 316) in a new reference state for the applicable client device.

Figure 4:
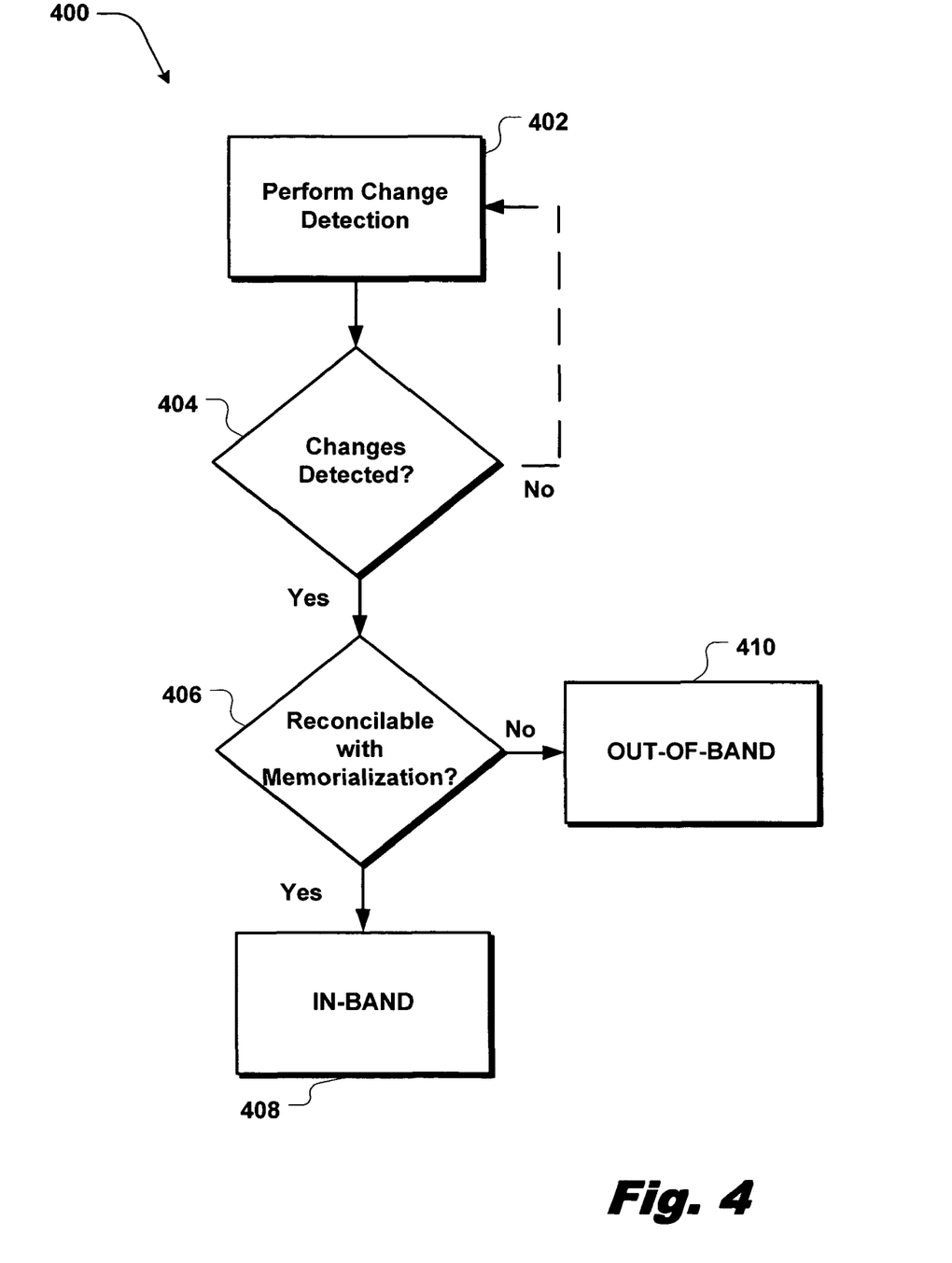
FIG. 4 illustrates some aspects of intended reconciliation, in accordance with various embodiments of this invention.

FIG. 4 illustrates some aspects of intended reconciliation operation 400, in accordance with various embodiments of this invention. While certain operations are illustrated in FIG. 4, other operations may supplement or supplant the operations shown, in the context of various embodiments. Intended reconciliation operation 400 may itself include various operations, including operation, Perform Change Detection 402, where a change detection agent may perform one or more change detection operations to a data processing device. Perform Change Detection 402 may be followed by an operation determining whether changes were detected as a result of performing the one or more change detection operations, denoted as, Changes Detected? 404.

If operation 404 is determined in the affirmative, then operation, Reconcilable with Memorialization? 406, may follow in some embodiments. If operation 404 is determined in the negative, then operation, Perform Change Detection 402, may follow in some embodiments, either immediately, after a delay, at a future scheduled time, etc. In various other embodiments, operation 404 being determined in the negative may be followed by another operation (not shown) or may comprise an endpoint, either temporary or otherwise.

If Reconcilable with Memorialization? 406 is determined in the affirmative, then designation, IN-BAND 408, may follow in some embodiments. If operation 406 is determined in the negative, then designation, OUT-OF-BAND 410, may follow in some embodiments. In various other embodiments, operation 406 being determined in either the negative or the positive may be followed by various other operations (not shown). The sophistication of operation 406 may vary widely, depending on the implementation and the information available to make the reconciliation. The designation of IN-BAND 408 may be followed by various operations, including but not limited to, elevating the detected change(s) to a baseline state of the data processing device in issue. The designation of OUT-OF-BAND 410 may be followed by various operations, including but not limited to, alerting such a designation of a detected change.

Figure 5:
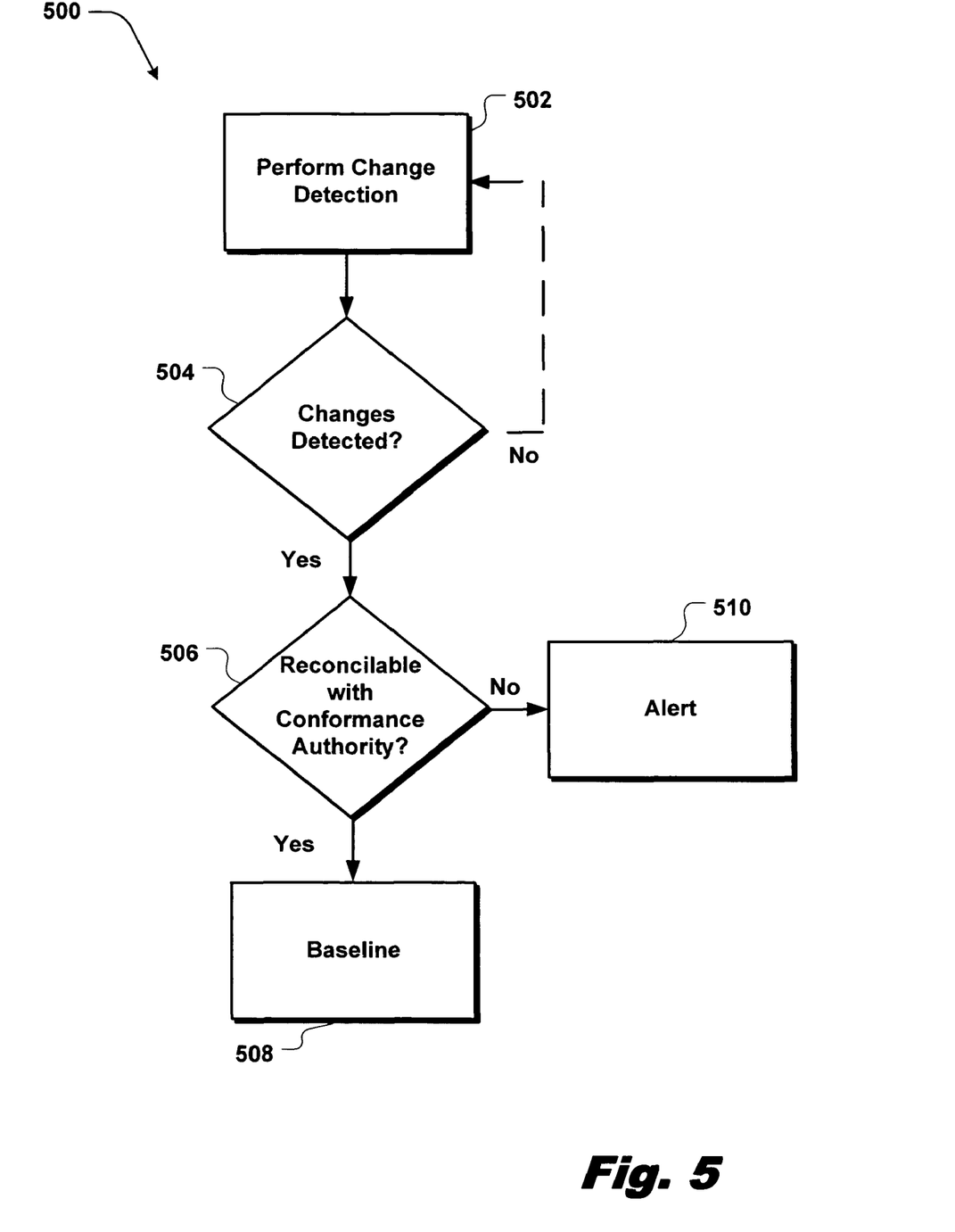
FIG. 5 illustrates some aspects of conforming reconciliation, in accordance with various embodiments of this invention.

FIG. 5 illustrates some aspects of conforming reconciliation operation 500, in accordance with various embodiments of this invention. While certain operations are illustrated in FIG. 5, other operations may supplement or supplant the operations shown, in the context of various embodiments. Conforming reconciliation operation 500 may itself include various operations, including operation, Perform Change Detection 502, where a change detection agent may perform one or more change detection operations to a data processing device. Perform Change Detection 502 may be followed by an operation determining whether changes were detected as a result of performing the one or more change detection operations, denoted as Changes Detected? 504. In various embodiments, some change detection agents that perform operation, Changes Detected? 504, may additionally or alternatively include other operations.

If operation 504 is determined in the affirmative, then operation, Reconcilable with Conformance Authority? 506, may follow in some embodiments. If operation 504 is determined in the negative, then operation, Perform Change Detection 502, may follow in some embodiments, either immediately, after a delay, at a future scheduled time, etc. In various other embodiments, operation 504 being determined in the negative may be followed by another operation (not shown) or may comprise an endpoint, either temporary or otherwise.

If Reconcilable with Conformance Authority? 506 is determined in the affirmative, then operation, Baseline 508, may follow in various embodiments. In various embodiments, Baseline 508 may include changing a baseline of an element of a data processing device to incorporate the change or changes detected in operation 504. In various embodiments, Baseline 508 may include additional or alternative sub-operations. In various embodiments, a baseline of an element may include a full version of the element. In various embodiments, a baseline of an element may include a text version of the element. In one such embodiment in the case where the element is a file, the baseline of the file may include a text version of the file. In various other embodiments, a baseline of an element may additionally or alternatively include other things, including but not limited to, attributes of the element.

In various embodiments, one or more additional operations other than Baseline 508 may follow an affirmative determination of Reconcilable with Conformance Authority? 506. In various embodiments, operation 506 being determined in the affirmative may be followed by modifying a severity state of the detected change (not shown), such as decreasing it. In various embodiments, operation 506 being determined in the affirmative may be followed by automatic approval of the detected change(s) without modification to the baseline state. In some other embodiments, no response may follow an affirmative determination of Reconcilable with Conformance Authority? 506.

If Reconcilable with Conformance Authority? 506 is determined in the negative, then operation, Alert 510, may follow in various embodiments. In various embodiments, Alert 510 may include alerting the nonconformance of a detected change. Alerting the nonconformance of a detected change may take many forms, according to various embodiments, including but not limited to, creating a helpdesk incident, alerting with a severity state indicator of the change in a GUI, notifying a user (for example, a system administrator) of the nonconforming change, reverting the element (or a portion of the element) back to its baseline state, etc. In various embodiments, operation 506 being determined in the negative may be followed by modifying a severity state of the change detected, such as increasing it. In various embodiments, Alert 510 may include facilitating a user to modify the element at issue to conform to at least one of the one or more guidelines of a conformance authority. In some embodiments, such facilitation may include reporting the one or more guidelines that were violated by the detected change. In various embodiments, such facilitation may include other sub-operations.

In various other embodiments, operation 506 being determined in the negative may be followed by various other operations. The sophistication of operation 506 may vary widely, depending on the implementation and the information available to make the reconciliation. In various embodiments, a further operation of determining one or more users associated with the detected change may be included. In various embodiments, Alert 510 may include the one or more users associated with the detected change. In some embodiments, the one or more users associated with the detected change may be the user(s) determined to have caused the change.

Figure 6:
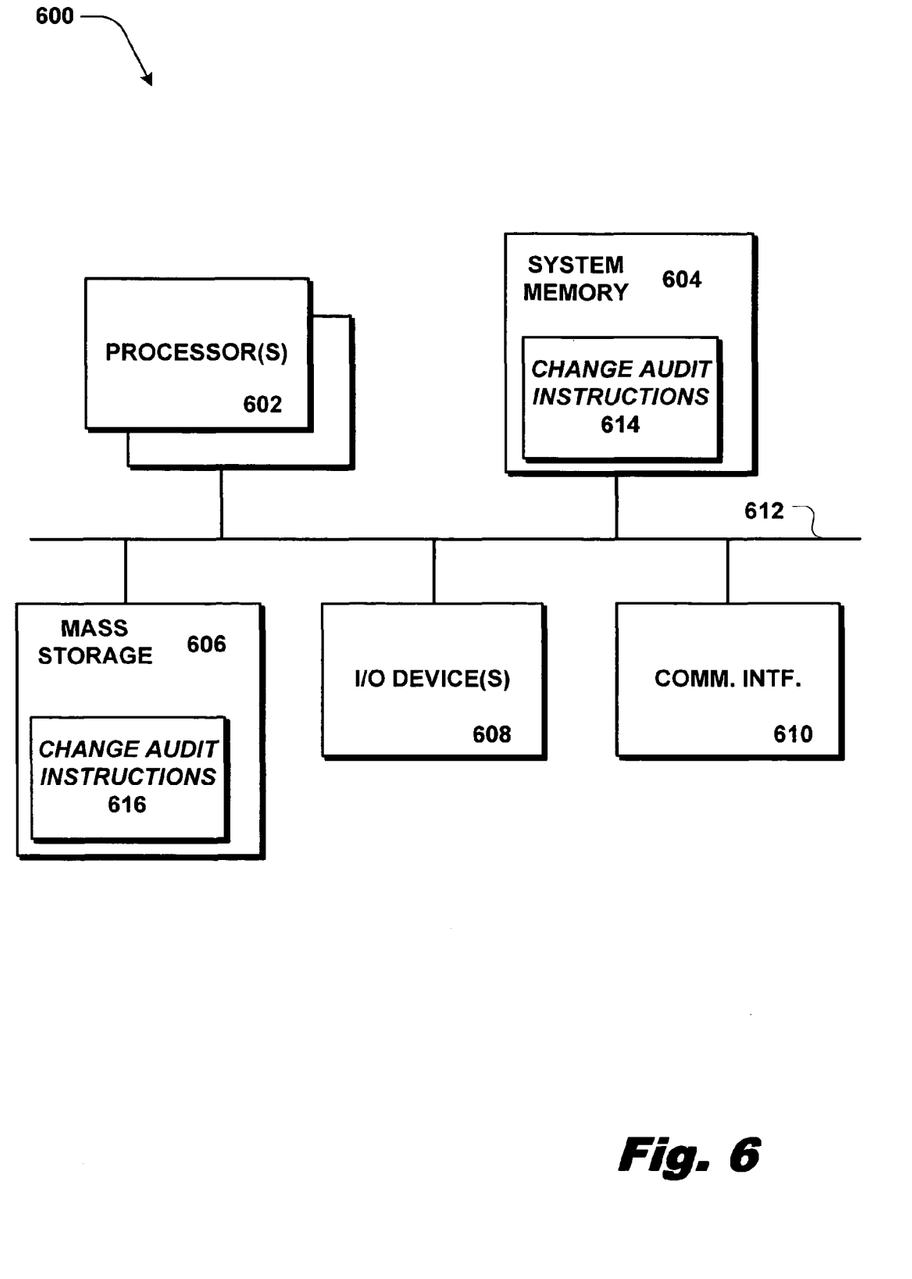
FIG. 6 illustrates an example computer system suitable for use in association with a change audit method, apparatus, or system, in accordance with various embodiments of this invention.

FIG. 6 illustrates an example computer system suitable for use in association with a change audit method, in accordance with various embodiments of this invention. As shown, computer system 600 may include one or more processors 602 and may include system memory 604. Additionally, computer system 600 may include mass storage 606 in the form of one or more devices (such as diskette, hard drive, compact disk (CD), flash memory, and so forth), input/output devices 608 (such as keyboard, cursor control and so forth) and communication interfaces 610 (such as network interface cards, modems and so forth). The elements may be coupled to each other via system bus 612, which may represent one or more buses. In the case where system bus 612 represents multiple buses, the multiple buses may be bridged by one or more bus bridges (not shown).

These elements each perform their conventional functions known in the art. In various embodiments, communication interfaces 610 may facilitate coupling of computing system 600 to a network, though which computing system 600 may be coupled to one or more data processing devices of a data processing environment and so forth, as necessary. In various embodiments, computing system 600 may at least be partially incorporated in such a data processing device. System memory 604 and mass storage 606 may be employed to store a working copy and a permanent copy of the programming instructions, illustrated as Change Audit Instructions 614 and 616, respectively, implementing various aspects of the one or more earlier described embodiments of the present invention. The permanent copy of the programming instructions may be loaded into mass storage 606 in the factory or in the field, through a distribution medium (not shown), or through communication interface 610 from, for example, a distribution server (not shown). The constitution of these elements 602-612 are known, and accordingly will not be further described. In alternate embodiments, part or all of the one or more modules may be implemented in hardware, for example, using one or more Application Specific Integrated Circuits (ASICs) instead.

Thus, it can be seen from the above description, a method for facilitating management of a data processing environment is described. In various embodiments, the method may include facilitating homogeneous monitoring of a plurality of heterogeneous data processing nodes of the data processing environment, the homogeneous monitoring including facilitating detecting one or more changes of one or more elements of the plurality of heterogeneous data processing nodes. In various embodiments, the method may further include facilitating performing one or more actions in response to detecting the one or more changes. Other embodiments of the present invention may include, but are not limited to, apparatuses and systems adapted to facilitate practice of the above-described method. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A computer-implemented method for facilitating management of a data processing environment on a system comprising one or more processors, the method comprising:

monitoring, by the one or more processors, a plurality of heterogeneous data processing nodes of the data processing environment;

detecting, by the one or more processors, one or more changes of one or more elements of the plurality of heterogeneous data processing nodes; and performing, by the one or more processors, one or more actions in response to detecting the one or more changes, the one or more actions including a reconciliation response;

wherein the reconciliation response comprises:

creating, by the one or more processors, in digital form, a first memorialization file comprising at least one indication of at least one of the one or more changes;

comparing, by the one or more processors, the first memorialization file to a second memorialization file comprising at least one indication of one or more changes that were known by a change agent;

determining, by the one or more processors, based at least in part on the comparison, that one or more changes indicated in the first memorialization file that were known by the change agent are intended changes; and determining, by the one or more processors, based at least in part on the comparison, that one or more changes indicated in the first memorialization file that were not known by the change agent are unintended changes.

2. The method of claim 1, wherein the detecting one or more changes comprises taking snapshots of states of one or more elements of the plurality of heterogeneous data processing nodes by the one or more processors.

3. The method of claim 2, wherein at least some of the snapshots are stored in a data warehouse.

4. The method of claim 1, wherein said monitoring the plurality of heterogeneous data processing nodes comprises defining, by the one or more processors, a first logical grouping of one or more data processing nodes to be monitored, the one or more data processing nodes corresponding to one or more data processing node-types.

5. The method of claim 4, wherein said monitoring further comprises defining, by the one or more processors, a second logical grouping of one or more rules to be asserted against at least a subset of the first logical grouping of data processing nodes, each of said one or more rules identifying criteria for detecting an operational state change of one or more data processing nodes.

6. The method of claim 5, wherein said monitoring further comprises generating, by the one or more processors, one or more monitoring tasks, each of said monitoring tasks defining which ones of the second logical grouping of rules are to be asserted against which ones of the first logical grouping of one or more data processing nodes.

7. The method of claim 1, wherein the one or more actions comprise one or more selected from the group consisting of an alert response, a baseline response, and modifying a severity state of at least one of the one or more changes detected.

8. The method of claim 1, wherein the reconciliation response further comprises determining, by the one or more processors, whether at least one of the one or more changes was authorized, including learning of a submission of a request, in digital form, to make a modification.

9. The method of claim 8, wherein said determining whether at least one of the one or more changes was authorized further includes determining, by the one or more processors, whether to allow the requested modification to be scheduled or assigned for implementation, in response to learning of the submission of the request.

10. The method of claim 9, wherein said determining whether at least one of the one or more changes was authorized further includes conditionally indicating, one or more processors, allowance of the requested modification, based at least in part on the result of the determining whether to allow the requested modification to be scheduled or assigned for implementation.

11. The method of claim 1, wherein the reconciliation response further comprises determining, by the one or more processors, whether at least one of the one or more changes conforms with a conformance authority, the conformance authority having one or more guidelines.

12. The method of claim 1, further comprising correlating, by the one or more processors, one of the one or more changes to one or more events associated with an element of the one or more elements; and reporting, by the one or more processors, the detected change for the element, supplemented with one or more of the correlated events of the element.

13. The method of claim 1, wherein at least one of the data processing nodes is a device selected from the group consisting of a networking device, a server, a desktop computer, a laptop computer, a tablet computer, a personal digital assistant, a cellular phone, a set top box, and a media player.

14. The method of claim 1, wherein the method further comprises using the one or more determined unintended changes to maintain or demonstrate control of an enterprise's information technology infrastructure.

15. The method of claim 1, wherein the method further comprises using the one or more determined unintended changes to maintain or demonstrate control of an enterprise's financial systems or data.

16. The method of claim 1, wherein the method further comprises using the one or more determined unintended changes to maintain or demonstrate control of an enterprise's business processes.

17. The method of claim 1, wherein the method further comprises using the one or more determined unintended changes to perform an audit of an enterprise.

18. The method of claim 17, wherein using the one or more determined unintended changes to perform an audit comprises providing an audit trail for an audit.

19. The method of claim 1, wherein the method further comprises using the one or more determined unintended changes to facilitate compliance with governmental laws/regulations regarding establishment and maintenance of an internal control structure and/or procedures for financial reporting.

20. A system comprising:

a computer processor; and a storage medium coupled to the processor and having stored therein instructions, that, when executed on a computer processor, cause the processor to perform a method, the method comprising:

monitoring a plurality of heterogeneous data processing nodes of a data processing environment;

detecting one or more changes of one or more elements of the plurality of heterogeneous data processing nodes; and performing one or more actions in response to detecting the one or more changes, including a reconciliation response;

wherein the reconciliation response comprises:

creating, in digital form, a first memorialization file comprising at least one indication of at least one of the one or more changes;

comparing the first memorialization file to a second memorialization file comprising at least one indication of one or more changes that were known by a change agent;

determining, based at least in part on the comparison, that one or more changes indicated in the first memorialization file that were known by the change agent are intended changes; and determining, based at least in part on the comparison, that one or more changes indicated in the first memorialization file that were not known by the change agent are unintended changes.

21. The system of claim 20, wherein the method further comprises:

taking snapshots of states of one or more elements of the plurality of heterogeneous data processing nodes; and storing at least some of the snapshots in a data warehouse.

22. The system of claim 20, wherein the method further comprises:

defining a first logical grouping of one or more data processing nodes to be monitored, the one or more data processing nodes corresponding to one or more data processing node-types;

defining a second logical grouping of one or more rules to be asserted against at least a subset of the first logical grouping of data processing nodes, each of said one or more rules identifying criteria for detecting an operational state change of one or more data processing nodes; and generating one or more monitoring tasks, each of said monitoring tasks defining which ones of the second logical grouping of rules are to be asserted against which ones of the first logical grouping of one or more data processing nodes.

23. The system of claim 20, wherein the one or more actions comprise one or more selected from the group comprising of an alert response and a baseline response.

24. The system of claim 20, wherein the reconciliation response further comprises:

determining whether at least one of the one or more changes was authorized, including learning of a submission of a request, in digital form, to make a modification;

determining whether to allow the requested modification to be scheduled or assigned for implementation, in response to learning of the submission of the request; and conditionally indicating allowance of the requested modification, based at least in part on the result of the determining whether to allow the requested modification to be scheduled or assigned for implementation.

25. The system of claim 20, wherein the reconciliation response further comprises determining whether at least one of the one or more changes conforms with a conformance authority, the conformance authority having one or more guidelines.

26. The system of claim 20, wherein the method further comprises maintaining or demonstrating control of one or more selected from the group consisting of an enterprise's information technology infrastructure, an enterprise's financial systems, an enterprise's financial data and an enterprise's business processes.

* * * * *